US008977658B2

(12) United States Patent
Meng et al.

(10) Patent No.: US 8,977,658 B2
(45) Date of Patent: Mar. 10, 2015

(54) SMARTCARD FILE SYSTEM AND FILE SELECTION METHOD THEREOF (75) Inventors: Hongwen Meng, Shanghai (CN); Shuo He, Shanghai (CN); Zhijun Lu, Shanghai (CN); Xiao Zhuang, Shanghai (CN)

(73) Assignee: China Unionpay Co., Ltd., Shanghai (CN)

( * ) Notice: Subject to any disclaimer, the term of this patent is extended or adjusted under 35 U.S.C. 154(b) by 218 days.

(21) Appl. No.: 13/510,580

(22) PCT Filed: Nov. 8, 2010

(86) PCT No.: PCT/CN2010/001783
§ 371 (c)(1),
(2), (4) Date: Aug. 6, 2012

(87) PCT Pub. No.: WO2011/060611
PCT Pub. Date: May 26, 2011

(65) Prior Publication Data
US 2012/0311001 A1 Dec. 6, 2012

(30) Foreign Application Priority Data

Nov. 20, 2009 (CN) .......................... 2009 1 0199218

(51) Int. Cl.
G06F 17/30 (2006.01)
(52) U.S. Cl.
CPC ................. *G06F 17/30218* (2013.01)
USPC ........................................................ 707/824
(58) Field of Classification Search
USPC ........................................................ 707/824
See application file for complete search history.

(56) References Cited

U.S. PATENT DOCUMENTS 6,944,650 B1 9/2005 Urien
2010/0030904 A1* 2/2010 Oda et al. .................. 709/228
2010/0240413 A1 9/2010 He et al.

FOREIGN PATENT DOCUMENTS

CN 1628297 6/2005
CN 101039480 A 9/2007
CN 101571869 A 11/2009

(Continued)

OTHER PUBLICATIONS

Open Mobile Alliance, Smartcard-Web-Server 1.0, Apr. 2008.*
SimAlliance, Smart Card Web Server, Feb. 2009.*

(Continued)

*Primary Examiner* — Jorge A Casanova
*Assistant Examiner* — William Spieler
(74) *Attorney, Agent, or Firm* — Blakely Sokoloff Taylor & Zafman (57) ABSTRACT The invention provides a Smartcard file system and its method for selecting file. Said file system, including MF as well as a variety of DFs and Efs in the MF, wherein application root directory (ADF) is added in the MF; the tile attributes of said ADF, DF and EF of the tile system include the Application Identifier (AID); when visiting with HTTP protocol, the AID is understood as a long file name. External entities accessing said file system with the HTTP protocol, namely locating the application and file managed with CWS via URL; in URL, AID of directory or file identities its long file name, so that Smartcard file system also can support long file system and the way of selecting file of URL, which makes Smartcard to support the WEB services easier and more accepted by the user.

13 Claims, 4 Drawing Sheets

ISO7816-4 file system          file system of long file name (56) References Cited

FOREIGN PATENT DOCUMENTS

CN 101621494 A 1/2010
EP 1791055 A1 5/2007

OTHER PUBLICATIONS

Open Mobile Alliance, OMA-TS-Smartcard_Web_Server_V1_1-20090512-A, May 2009.*

ETSI, ETSI TS 101 220, Smart Cards: ETSI numbering system for telecommunication application providers (Release 8), Apr. 2009.*

ETSI, ETSI TS 102 588, Smart Cards: Application invocation Application Programming Interface (API) by a UICC webserver for Java CardTM platform (Release 7), May 2008.*

ETSI, ETSI TS 102 221, Smart Cards: UICC-Terminal interface; Physical and logical characteristics (Release 8), Jun. 2009.*

"Provisioning Smartcard: OMA-WAP-TS-ProvSC-V1_1-20090728-A" Open Mobile Alliance (OMA), Jul. 28, 2009, 39 pages.

Rees J, et al. "Webcard: A Java Card Web Server", Center for Informational Technology Integration, University of Michigan, URL: Http://smarty.citi.umich.edu, Sep. 20, 2000, pp. 197-207.

* cited by examiner

Fig. 1

(PRIOR ART)

Fig. 2

(PRIOR ART)

SMARTCARD FILE SYSTEM AND FILE SELECTION METHOD THEREOF

FIELD OF THE INVENTION

The present invention relates to the technical field of Smartcard, and relates to a file system of the Smartcard.

BACKGROUND

Smartcard is also named as Integrated Circuit card, i.e. IC card. Smartcard including an Integrated Circuit chip embedded in a plastic substrate is packaged as a form of card, and its shape is similar to a magnetic card covered with magnetic stripe. A concept of Smartcard came forth in 1970s. In 1976, BULL corporation in France firstly contrived a Smartcard product, and further applied this technology to multi-fields such as finance, traffic, medical treatment, identity certificate and the like. The Smartcard chip has the capability of writing data and storing data. When necessary, contents stored in the memory of the Smartcard can be conditionally provided for outer reading, interior information process and determination.

The Smartcard file system is analogous to a tree-like file system of DOS. ISO7816 supports two kinds of file: Dedicated File (named as "DF") and Elementary File (named as "EF"). DF is in some wise similar to DOS directory, while EF is in some wise similar to data file. DF(s) in the DF, which of course could further include DF(s), is similar to DOS subdirectory. Similar to file system of DOS, the Smartcard file system also must include a root file that is a DF, and this root file is called as Master File (named as "MF") that is similar to the root directory of DOS.)

In structure of the Smartcard file system, it can but has one MF, and number of DF is optional. MF and DF play the role of managing and forming the structure of tree-like file system, and the file for storage data is EF.

MF is the root of Smartcard file system, and all kinds of DF and EF can be created in the MF. Although the file system permits to directly generate all sorts of application file of EF, the best method for organizing file lies in allotting one DF to every kind of application and further organizing all kinds of application data of EF in the corresponding DF.

DF, in which all kinds of DF and EF can be created, contains information of file control and distributable storage area. Generally, one DF is used to storing all data corresponding to one application. DF occupies a block of SRAM in the user memory; once the DF is created, the size of DF's SRAM is invariable. For EF in this DF, however, the size of memory used by EF can be redistributed, and also can be deleted. After deleting the DF, DF(s) and EF(s) in the deleted DF is also deleted simultaneously; the block of memory released by deleting can be used by other DF(s).

EF acts as a leaf of the tree-like Smartcard file system, in which other file(s) can't be created.

Figure 1:
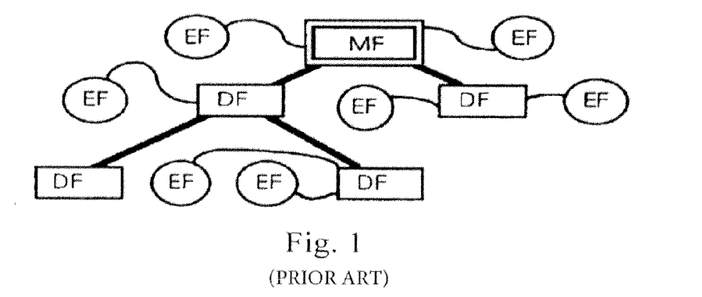
FIG. 1 is a file system in the prior art.

The existing Smartcard file system follows defining of ISO7816-4. As shown in FIG. 1, wherein MF indicates the logic root directory of the file system which has only one MF; DF (Dedicated File) usually is the root directory of the Smartcard application, similar to subdirectory, which exists in the MF or other DF; EF (Elementary File) usually is used to store cipher keys or application data and it exists in the MF or DF.

Wherein, MF's attribute lies in: File Identifier (named as "FID") of two bytes 3F00 (hex and same to hereinafter);

DF's attributes lies in: File Identifier (named as "FID") of two bytes (not 3F00, 0000, or FFFF), Application Identifier (named as "AID") with up to 16 bytes and at least 5 bytes;

EF's attributes lies in: File Identifier (named as "FID") of two bytes (not 3F00, 0000, or FFFF), Short File Identifier (named as "SID") of one byte;

Limitation lies that: FID of every DF must be unique, FID of every EF must be unique, and every DF can but possess 31 EFs at most.

The way of selecting file is the following:

Selecting by FID: MF, DF or EF can be selected by designated FID;

Selecting by path: DF or EF can be selected by selecting the path of DF or EF, in the path, root directory locating in front and the subdirectory locating behind, it either can be a relative path (current DF as a starting point) or can be a absolute path (MF as a starting point);

Selecting by Short File Identifier (named as "SID"): only EF can be selected in this way, and EF in current MF or DF is selected by SID of designated file.

ISO7816-4 defines four basic types of EF which respectively are:

Transparent File also called as binary file;
Linear Fixed File also called as fixed-length file;
Linear Variable File also called as variable-length file;
Cyclic Fixed File also called as cyclic-recording file.

All files are physically stored in the nonvolatile memory area (typically EEPROM or FLASH) of the Smartcard.

However, the existing file system has disadvantage as follows.

1. If operation system of Smartcard supports the service provided by the WEB server (WebServer), it customarily uses a file system similar to FAT16 or FAT32 which prominent characteristic lies in long file name. But the file system of ISO7816-4 does not meet with this characteristic, namely, it does not support the long file name; moreover, supporting WEB service is a developing trend of Smartcard, which means that it is necessary for considering the long file name;

2. As all files are stored in the nonvolatile memory area and they does not support temporary file, applying inner share information must depend on global variable of internal storage or permanent file.

As can be seen, for supporting WEB service, it is necessary to re-define the structure of file system such that the file system can support WEB service; namely, it is necessary to define a new directory node for supporting WEB service, which mainly means that the file system defined by ISO7816-4 employs DF as root directory of application, and the DF can be embedded but lack of characteristic in giving prominence to application root directory. Moreover, for supporting long file name, it is necessary to re-define characteristic for every directory node in file system; and it is necessary to add the way of selecting file, namely, the way of selecting file need to support selecting way of URL as Smartcard is required to support WEB service; and it is necessary to support creating temporary file, A new Smartcard file system is hereby provided in this invention.

SUMMARY OF THE INVENTION

The propose of the invention is to provide a new Smartcard file system for supporting WEB service and long file name.

In accordance with one aspect of the invention, A Smartcard file system is provided, it includes MF (Master File) as well as a variety of DFs (Dedicated Files) and Efs (Elementary Files) in the MF, wherein application root directory (ADF) is added in the MF; said ADF, in which DF(s) or EF(s) is set, is the main directory of Smartcard application.

Application directory file (EFdir) and Smartcard WEB server configuration information directory (DFcws), and WEB server basic configuration information file (EFcfg) and WEB server authorizing user information file (EFuser) configured in the DFcws, are added in the MF.

The EFdir records all applications and its associated information installed in the file system, and said EFdir is a directory entry file which records the entries, pointing to certain said ADF, of the applications installed on the Smartcard.

Further, File Identifier (FID) of attributes of said ADF and DF is 2 bytes that can not be 3F00 or 0000 or FFFF, and Application Identifier (AID), up to 16 bytes and at least 5 bytes, is understood as a long file names when accessing with the HTTP protocol. Attributes of said EF include storage type identifying that the file is volatile or nonvolatile; Application Identifier (AID), up to 16 bytes and at least 5 bytes, is understood as a long file names when accessing with the HTTP protocol. If the storage type of the file is identified as nonvolatile, then its storage area is located in a nonvolatile storage area, typically EEPROM or FLASH; if the storage type of the file is identified as volatile, its storage area is located in the volatile storage area, typically RAM.

In accordance with another aspect of the invention, A Method for selecting file in a Smartcard file system is provided, said Smartcard file system including MF (Master File) as well as a variety of DFs (Dedicated Files) and Efs (Elementary Files) in the MF in which also has application root directory (ADF); external entities accessing said file system with the HTTP protocol, namely locating the application and file managed with the Card WEB Server (CWS) via URL. The external entities locating the application and file managed with the CWS via URL includes the following steps:

Step 1, the external entities send a service request message to the CWS according to HTTP protocol, two parts information of path and query string identified in the message;

Step 2, the CWS locates requested application and path according to the content of two parts of path and query string.

Further, the path of said URL contains the application name which is expressed with hexadecimal ASCII code of Application Identifier (AID), preceded by three characters of "AID/", and is followed by the host name.

Further, the directory/file name is coded to the URL via its FID, two-byte FID encoded as four bytes ASCII strings between which using '/' separator. The AID of directory or file identifies its long file name and its hexadecimal string is used to express the long file name, and is encoded to the URL.

Further, if the URL does not contain the AID, the CWS parses the file path in current application; if the context of current file does not contain current application, the file path is parsed in the root directory of the MF. If the URL using reserved FID: 7FFF, in any file system, it identifies a reference to the current application; if the channel does contain the current application, then an error status is returned.

Further, if the URL does not contains the AID or identifier of 7FFF, then the CWS matches requested path to the file in the current directory; if lack of the current directory or the current application, it returns an error status.

Further, when the accessing the Smartcard with the HTTP protocol, if the application path is not is not designated, the CWS will automatically form the application list as return results according to the content of the application directory file (EFdir)

The present invention makes the traditional Smartcard file system also can support long file system and the file selecting way of URL, which makes the Smartcard supporting WEB service more easily and more acceptable by the user. Liking as a generalist, the new Smartcard file system shows different characteristics and methods under different interfaces.

DETAILED DESCRIPTION OF THE INVENTION

This proposal puts forward a new type of Smartcard file system, and its key features lie in extending the traditional Smartcard file system (defined by ISO7816-4) and making it compatible with long file name system (similar to FAT16 or FAT32) which are indicated for Smartcard better meeting the usage habits in case of supporting WEB service.

Figure 2:
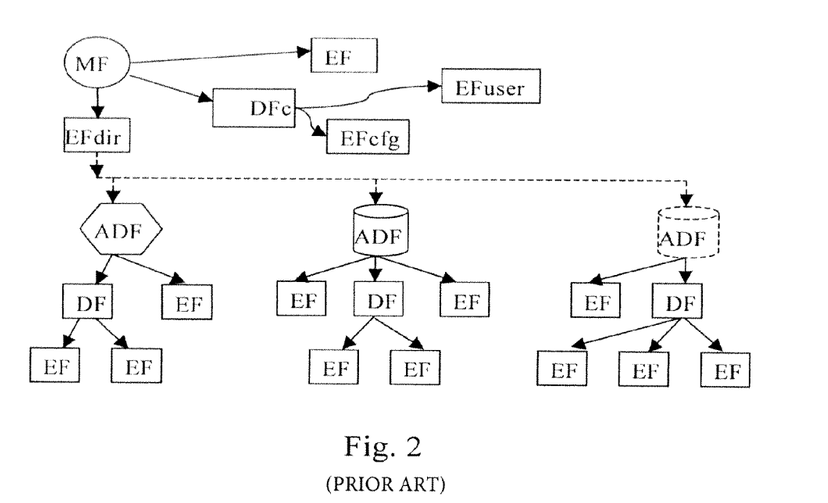
FIG. 2 is a Smartcard file system provided according to the invention.

According to technical problems to be solved described in the background, a re-defined structure of file system is shown in FIG. 2.

1. Node defining:
    MF: logic root directory of the file system, a file system only with one MF;
    ADF: application root directory, it is the home directory of Smartcard application, in which can be DF(s) or EF(s);
    DF: Dedicated File, similar to a subdirectory, existing in the MF, the ADF or other DF.
    EF: Elementary Files, usually used to store cipher keys or application data, existing in the MF, the ADF or DF;
2. Attribute defining:
    MF's attributes: File Identifier FID with two bytes: 3F00;
    ADF's attributes: File Identifier FID with two bytes that can not be 3F00 or 0000 or FFFF; Application Identifier AID, up to 16 bytes and at least 5 bytes, is understood as a long file name when accessing with HTTP protocol;
    DF's attributes: File Identifier FID with 2 bytes that can not be 3F00 or 0000 or FFFF; Application Identifier AID, up to 16 bytes and at least 5 bytes, is understood as a long file name when accessing with HTTP protocol;
    EF's attributes: storage type identifying the file is volatile or nonvolatile; File Identifier FID with 2 bytes; Short File Identifier SID with one byte; Application Identifier AID, up to 16 bytes and at least 5 bytes, understood as a long file name when accessing with HTTP protocol.
    Note: If the storage type identifier of file is identified as nonvolatile, then its storage area is located in a nonvolatile memory area, typically EEPROM or FLASH; if the storage type identifier is identified as volatile, then its storage area is located in a nonvolatile memory area, typically RAM.
3. Predefining file specification:
    As the main propose of redefining file system is to support the WEB service, some system files and directories are predefined herein for this propose:
    EFdir: application directory file, recording of all applications and its related information installed in the file system, being an directory entry file, and recording the entries, which point to certain ADF, of application installed in the Smartcard. Mode for installing applications is via the HTTP protocol rather than the traditional APDU protocol; when the application is installed to the Smartcard, it will automatically form a record in the Efdir which describes the application of name, logo, type, entries and related attributes including attribution of field etc.; when accessing the Smartcard with the HTTP protocol, if the application path is not designated, CWS (Card Web Server) will automatically form the application list as return results according to the content of the EFdir.

DFcws: Card WEB server (name as "CWS") configuration information directory, storing system configuration information of CWS.

EFcfg: CWS basic configuration information.

CWS system configuration information and basic configuration information, including the configuration (7816, ISO14443, the SWP, the TCP, etc.) of the hardware interface of Smartcard, size of RAM and EEPROM, application concurrency-related parameters.

EFuser: CWS authorizing user information, the user list operated by CWS, which record the user's permissions and identity, domain and other attributes, 4. The way of selecting file:

The way of selecting file is various; if accessing with the APDU protocol, it supports traditional selecting way, such as FID selecting and path selecting etc.; if accessing with the HTTP protocol, then selecting way via URL is added and supported, of course, other way such as via AOH protocol can be used to select the file.

In addition to supporting the above-mentioned selecting way defined with ISO7816-4, the present invention also defines the selecting way of URL which aims that the file system supports that external entities (terminals) access the file system with the HTTP protocol.

Figure 3:
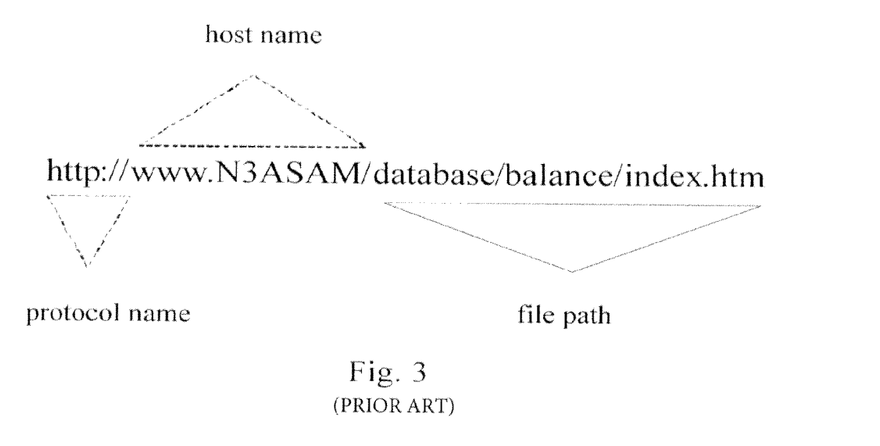
FIG. 3 is a URL structure defined by RFC1738.

In the HTTP protocol, terminals locate applications and documents managed with CWS via URL. For disk file system, the definition of the URL refers to RFC 1738; according to RFC1738 provision, the URL consists of several parts: protocol name, host name and file path; FIG. 3 is a typical URL structure, including protocol name, host name and file path.

URL definition:

<protocol>://<host>/{:<port>}/<path>?<searchpart>

Description:

<protocol> is the protocol identifier, and can be 'http' or 'https';

<host> identifies domain name of the host, or its IP address in form of four groups decimal number gather separated by ".". The form of domain name is described in section 3.5 of RFC1034 [13] and section 2.1 of RFC 1123 [5], namely domain sign string separated by "."; domain signs use letter or number at its beginning and ending, and may also contain "-" character. The rightmost domain sign can not begin with a number so that the domain name is distinguished from IP address by grammatical structure.

<port> designates link port. It is used to assign a default port to the protocol. Port in decimal form also can be optionally assigned to a port that is separated with the host by a colon. If you neglect the port, then the colon should also be neglected.

<path> is a HTTP selector, and <searchpart> is the query string.

The URL path <path>, URL query string <searchpart> and "?" in front of <searchpart> are optional. In case without both <path> and <searchpart>, then "/" can also be omitted. "/", ";" and "?" in <path> and <searchpart> section are reserved characters. "/" character in the HTTP can be used to indicate hierarchy.

External entities (terminals) access the file system with the HTTP protocol. External entities access the file system via the URL in the browser; after the browser connecting with remote servers (for the browser, the CWS on Smartcard is also a remote Web server) through the native network device, a service request message (http request message) is sent to the remote server (CWS) according to the protocol (such as http). Two parts information of path and query string are identified in the message; CWS locates requested applications and path according to the content of two parts of path and query string. Except for two parts of path and query string, parts before the two parts are possibly existed in the request message, and the CWS can make the appropriate dispose may not.

Figure 4:
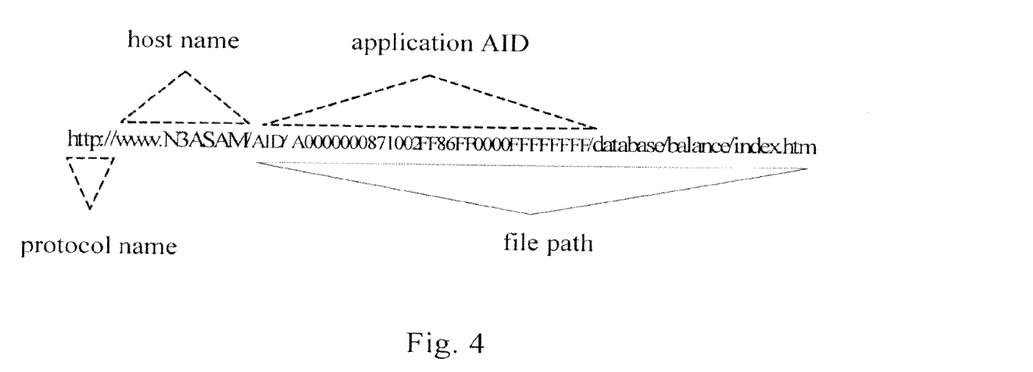
FIG. 4 is a URL structure according to one instance of the invention.

The present invention requests that the file path should use full path, and the file path may contain the application name: application name is expressed with hexadecimal ASCII code of the AID, preceded by three characters of "AID/", and the application name followed by the host name. FIG. 4 is a typical URL structure, file path including the application of the AID.

If the URL contains the AID, after CWS handling, the operation of application selection would be carried out in accordance with the order front to back, and the context of current file is set.

If the URL does not contain the AID, the CWS parses the file path in current application; if the context of current file does not contain current application, the file path is parsed in the root directory of the MF.

Figure 5:
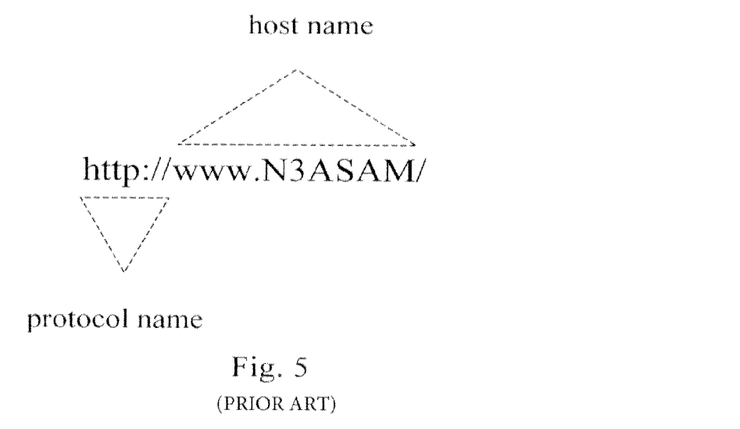
FIG. 5 is a most simple URL structure.

FIG. 5 is one simplest URL structure which has not a file path. The CWS parses this path, and sends pages of application list, and simultaneously resets the current file context.

Figure 6:
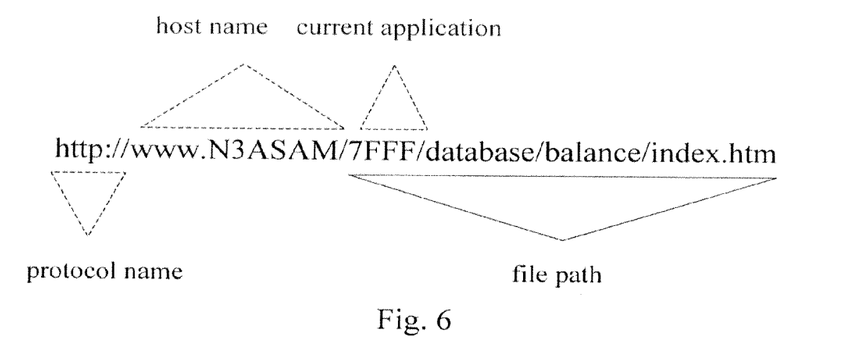
FIG. 6 is a URL structure in current application according to the invention.

Reserved FID: 7FFF is used in FIG. 6. In any file system, it identifies the reference to the current application; if the channel does contain the current application, then an error status is returned.

If the URL does not contains the AID or identifier of 7FFF, then the CWS matches the request path to the files in the current directory. If lack of the current directory or the current application, it returns an error status.

In general, the CWS only parses file path part of the URL, other parts is parsed outside the card. If the CWS receives the protocol name and host name, a necessary check can be done.

There are no long file names, only including two bytes of the FID, in ISO7816 file system directories and files. In this case, using encode format of the URL defined as follows:

1, Encode format of AID, AID is a binary numeric with 16 bytes at most. In the URL, AID is expressed in form of hexadecimal string that contains up to 32 ASCII characters, and before which 'AID/' strings is added.

For example:

CWS applications: URL of AID (AID='A0000000871002FF86FF0000FFFFFFFF') is:

http://hostname/AID/
A0000000871002FF86FF0000FFFFFFFF/

2, Encode format of the file path, directory/file name encoded into URL of CWS in the form of hexadecimal string of FID, two-byte FID encoded as four bytes ASCII strings between which using '/' separator.

For example, when application of DF='5F30' and EF='4F01' in
AID='A0000000871002FF86FF0000FFFFFFFF',
the URL is:

http://hostname/AID/
   A0000000871002FF86FF0000FFFFFFFF/5F30/
   4F01

If CWS operates '5F30'|'4F01' the under the current application, the URL is:

http://hostname/7FFF/5F30/4F01

As mentioned above, 7FFF is reserved FID, used to refer to the current application.

Under the HTTP protocol, AID of directory or file identify its long file name, in which its hexadecimal string is used to express the long file name. For example:

Application 1: AID=A0 00 00 03 33 01 00
Subdirectory 1: FID=DF01, AID=64 61 74 61 62 61 73 65
File 1: FID=EF01, AID=69 6E 64 65 78 2E 68 74 6D 6C
Decimal string of AID of Subdirectory 1 is "database";
Decimal string of AID of File 1 is "index.html";
Accessing to the URL as follows:
   http://hostname/AID/A0000003330100/database/index.html
   or: http://hostname/AID/A0000003330100/DF01/EF01

The hexadecimal encode of the FID, or also possible long file name (ASCII encode) in AID, can be followed behind the AID. The CWS can automatic distinguish them based that the length of the FID must be 2 bytes and AID must be at least 6 bytes.

Figure 7:
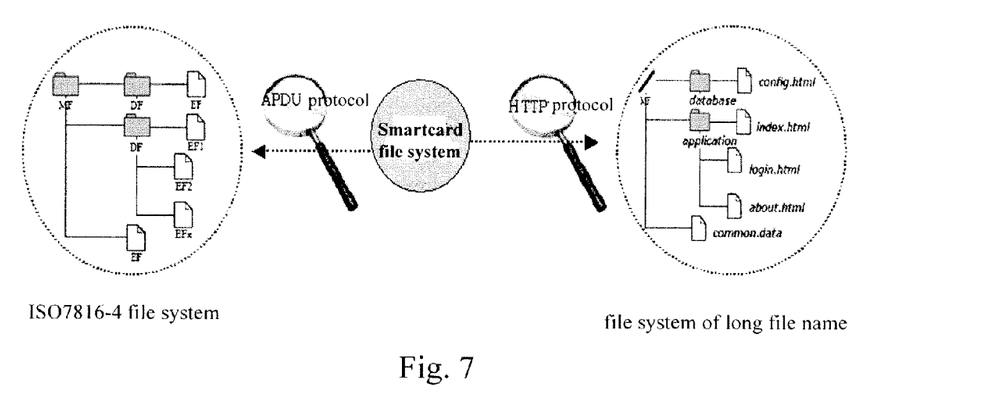
FIG. 7 is a schematic view of the Smartcard file system used in different interface according to the invention.

FIG. 7 shows a redefinition of ISO7816-4 file system, making the traditional Smartcard file system also can support long file system and the file selecting way of URL, which makes the Smartcard supporting WEB service more easily and more acceptable by the user. Liking as a generalist, the new Smartcard file system shows different characteristics and methods under different interfaces.

The invention claimed is:

1. A Smartcard, comprising:
   a Master File (MF);
   a plurality of Dedicated Files (DFs);
   a plurality of Elementary Files (EFs);
   an application root directory (ADF);
   an application directory file (EFdir);
   a WEB server basic configuration information file (EFcfg);
   a WEB server authorizing user information file (EFuser); and
   a Smartcard WEB server configuration information directory (DFcws);
   wherein said EFdir, said DFcws are subfiles of said MF, said EFcfg and said EFuser are subfiles of said DFcws, and said ADF is a main directory of one of a plurality of Smartcard applications and includes as subfiles one of said DFs and at least one of said EFs;
   said Smartcard configured to receive data from an external source for accessing a Smartcard file system for locating an application stored on said Smartcard and its related files using a Card WEB Server (CWS) via an ADF for said application,
   wherein attributes of each of said plurality of EFs include 1) a storage type identifying that a file storage type of said EF is one of a volatile storage and a nonvolatile storage, and 2) an Application Identifier (AID) having a length of 5 to 16 bytes, for use as a long file name for accessing with an HTTP protocol.

2. The Smartcard according to claim 1, wherein said EFdir records all applications and its associated information installed in the file system, and said EFdir is a directory entry file, which records the entries, pointing to a certain ADF corresponding to one of the applications installed on the Smartcard.

3. The Smartcard according to claim 1, wherein a File Identifier (FID) of attributes of said ADF and DF is 2 bytes that can not be 3F00 or 0000 or FFFF, and an Application Identifier (AID), up to 16 bytes and at least 5 bytes, is provided as a long file name for accessing with an HTTP protocol.

4. The Smartcard according to claim 1, wherein, if the storage type of the file is identified as nonvolatile, then its storage area is located in a nonvolatile storage area, and if the storage type of the file is identified as volatile, its storage area is located in a volatile storage area.

5. A Method for selecting a file in a Smartcard file system, said Smartcard file system including a Master File (MF), including a plurality of Dedicated Files (DFs), Elementary Files (EFs) and an application root directory (ADF), comprising:
   setting said DFs and EFs in said ADF, said ADF being a main directory of a Smartcard application;
   adding in the MF an application directory file (EFdir), a Smartcard WEB server configuration information directory (DFcws), wherein a WEB server basic configuration information file (EFcig) and a WEB server authorizing user information file (EFuser) are configured in the DFcws;
   enabling external entities to access said file system with an HTTP protocol via a URL, and locating an application and its related files using a Card WEB Server (CWS) via an ADF for said application
   wherein attributes of each of said plurality of EFs include 1) a storage type identifying that a file storage type is one of a volatile storage and a nonvolatile storage; and 2) an Application Identifier (AID), having a length of 5 to 16 bytes, for use as a long file name for accessing with HTTP protocol.

6. The Method for selecting a file in the Smartcard file system according to claim 5, wherein the external entities locating the application and file managed with the CWS via the URL, said method further comprising:
   a) the external entities sending a service request message to the CWS according to the HTTP protocol, wherein a path and a query string are identified in the service request message;
   b) the CWS locating a requested application and a path according to the content of the service request message.

7. The Method for selecting a file in the Smartcard file system according to claim 6, wherein the path of said URL selectively contains the application name expressed in hexadecimal ASCII code of an Application Identifier (AID), preceded by the characters "AID/", and a host name.

8. The Method for selecting a file in the Smartcard file system according to claim 7, wherein a name of a directory/file is coded in a URL via its two byte file ID (FID), encoded as four byte ASCII strings using a '/' character as a separator between each of said four bytes.

9. The Method for selecting a file in the Smartcard file system according to claim 7, wherein a long file name of the ADF, DF or EF is identified by its AID in which its hexadecimal string is used to express the long file name, and is encoded as the URL.

10. The Method for selecting a file in the Smartcard file system according to claim 7, wherein, if the URL does not contain the AID, the CWS parses the file path in a current application; if the context of a current file does not contain the current application, the file path is parsed in the root directory of the MF.

11. The Method for selecting a file in the Smartcard file system according to claim 10, wherein if the URL uses a reserved FID: 7FFF, in any file system, said URL identifies a reference to the current application; if the current application is not active during said selecting, then an error status is returned.

12. The Method for selecting a file in the Smartcard file system according to claim 11, wherein if the URL does not contain the AID or the FID 7FFF, then the CWS matches the requested path to the file in the current directory; if the current directory or the current application is not active during said selecting, then an error status is returned.

13. The Method for selecting a file in the Smartcard file system according to claim 7, wherein when accessing the Smartcard with the HTTP protocol, if the application name is not included in said URL, the CWS will automatically form an application list as a return result, according to the content of the EFdir.

\* \* \* \* \*